United States Patent
Fujiki

(10) Patent No.: US 10,554,858 B2
(45) Date of Patent: Feb. 4, 2020

(54) IMAGE PROCESSING APPARATUS AND IMAGE PROCESSING METHOD

(71) Applicant: FUJI XEROX CO., LTD., Tokyo (JP)

(72) Inventor: Ryuji Fujiki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/988,443

(22) Filed: May 24, 2018

(65) Prior Publication Data
US 2019/0116292 A1 Apr. 18, 2019

(30) Foreign Application Priority Data
Oct. 16, 2017 (JP) .................................. 2017-200388

(51) Int. Cl.
| | | |
|---|---|---|
| *H04N 1/58* | (2006.01) | |
| *G06T 7/13* | (2017.01) | |
| *H04N 1/00* | (2006.01) | |
| *G06T 1/00* | (2006.01) | |

(52) U.S. Cl.
CPC ............. *H04N 1/58* (2013.01); *G06T 1/0007* (2013.01); *G06T 7/13* (2017.01); *H04N 1/00639* (2013.01); *G06T 2200/28* (2013.01); *H04N 2201/0094* (2013.01)

(58) Field of Classification Search
CPC ................. H04N 1/58; H04N 1/00639; H04N 2201/0094; G06T 1/0007; G06T 7/13; G06T 2200/28

USPC ........................................................ 358/1.15
See application file for complete search history.

(56) References Cited

U.S. PATENT DOCUMENTS

| | | | | |
|---|---|---|---|---|
| 2001/0054342 | A1* | 12/2001 | Kato ........................ | B26D 1/08 83/78 |
| 2015/0021845 | A1* | 1/2015 | Kitamura ........... | G03G 15/6544 270/1.01 |
| 2015/0251474 | A1* | 9/2015 | Ooba ........................ | B42C 1/12 493/8 |

FOREIGN PATENT DOCUMENTS

JP 2016-158113 A 9/2016

* cited by examiner

*Primary Examiner* — Tammy Paige Goddard
*Assistant Examiner* — Darryl V Dottin
(74) *Attorney, Agent, or Firm* — Sughrue Mion, PLLC

(57) ABSTRACT

An image processing apparatus includes a reading unit and a correction information output unit. The reading unit acquires a saddle-stitched surface picture by reading a saddle-stitched surface of a saddle-stitched booklet formed through folding and stapling processes performed by a saddle-stitching device, and acquires a cover surface picture by reading a cover surface of the saddle-stitched booklet. The correction information output unit outputs correction information about a stapling position to the saddle-stitching device. The correction information is calculated on the basis of a difference between a cover-side fold line position on the cover surface picture, which is specified on the basis of a saddle stitch-side fold line position detected from the saddle-stitched surface picture, and a staple position detected from the cover surface picture.

9 Claims, 10 Drawing Sheets

IMAGE PROCESSING APPARATUS AND IMAGE PROCESSING METHOD

CROSS-REFERENCE TO RELATED APPLICATIONS

This application is based on and claims priority under 35 USC 119 from Japanese Patent Application No. 2017-200388 filed Oct. 16, 2017.

BACKGROUND

(i) Technical Field

The present invention relates to an image processing apparatus and an image processing method.

(ii) Related Art

There is known a saddle-stitching process in which plural sheets of paper are folded into two halves and bound using staples at the position of a fold line to form a saddle-stitched booklet (see FIG. 14).

The position of the fold line occasionally differs slightly because of a difference in the paper characteristics (such as size, thickness, and stiffness) among types of paper used for saddle-stitched booklets or a difference in the number of sheets of paper used in each saddle-stitched booklet. Thus, it is occasionally necessary to adjust the positions of the staples with the position of the fold line.

FIGS. 15A and 15B illustrate a saddle-stitched booklet as seen from the tail side (or the head side).

SUMMARY

According to an aspect of the present invention, there is provided an image processing apparatus including: a reading unit that acquires a saddle-stitched surface picture by reading a saddle-stitched surface of a saddle-stitched booklet formed through folding and stapling processes performed by a saddle-stitching device, and that acquires a cover surface picture by reading a cover surface of the saddle-stitched booklet; and a correction information output unit that outputs correction information about a stapling position to the saddle-stitching device, the correction information being calculated on a basis of a difference between a cover-side fold line position on the cover surface picture, which is specified on a basis of a saddle stitch-side fold line position detected from the saddle-stitched surface picture, and a staple position detected from the cover surface picture.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below.

First Exemplary Embodiment

Figure 1:
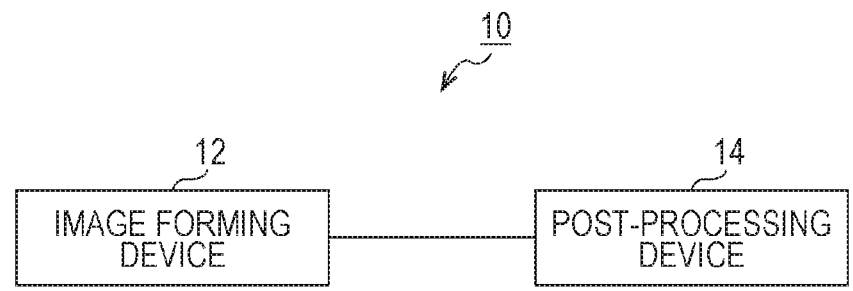
FIG. 1 illustrates a schematic configuration of an image processing system according to an exemplary embodiment.

FIG. 1 illustrates a schematic configuration of an image processing system 10 according to the present exemplary embodiment. The image processing system 10 includes an image forming device 12 that serves as an image processing apparatus, and a post-processing device 14 that serves as a saddle-stitching device.

The image forming device 12 is a multi-function device that includes a print (printing) function, a scan (image reading) function, a copy function, and so forth. For example, the image forming device 12 processes print data designated in a print job input from a user to form an image on a printing medium such as paper (print function). In addition, the image forming device 12 optically reads a document such as a paper document set by the user to generate image data (scan function). The copy function executes a process for determining image data read using the scan function as print data, and printing the print data using the print function. Printed paper on which printing has been performed using the print function or the like is sent to the post-processing device 14. The image forming device 12 will be discussed in detail later.

Figure 2:
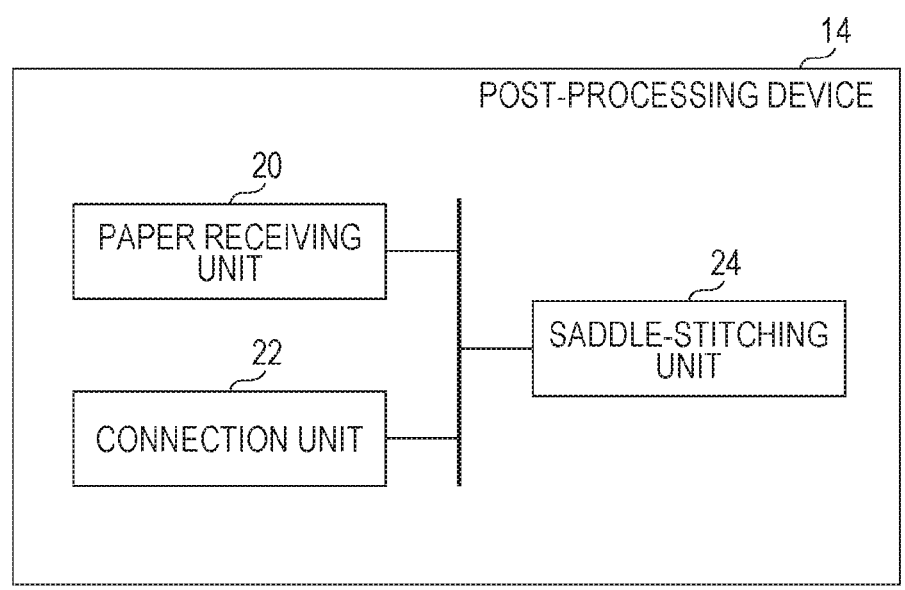
FIG. 2 illustrates a schematic configuration of a post-processing device according to the exemplary embodiment.

FIG. 2 illustrates a schematic configuration of the post-processing device 14.

A paper receiving unit 20 includes a paper feed roller etc., and receives the printed paper from the image forming device 12 and transports the printed paper to a saddle-stitching unit 24 to be discussed later.

A connection unit 22 includes a connector etc., for example, and is provided to be connected to the image forming device 12 so as to be communicable. Setting information about a saddle-stitching process performed by the saddle-stitching unit 24 may be received from the image forming device 12 through connection through the connection unit 22.

Figure 14:
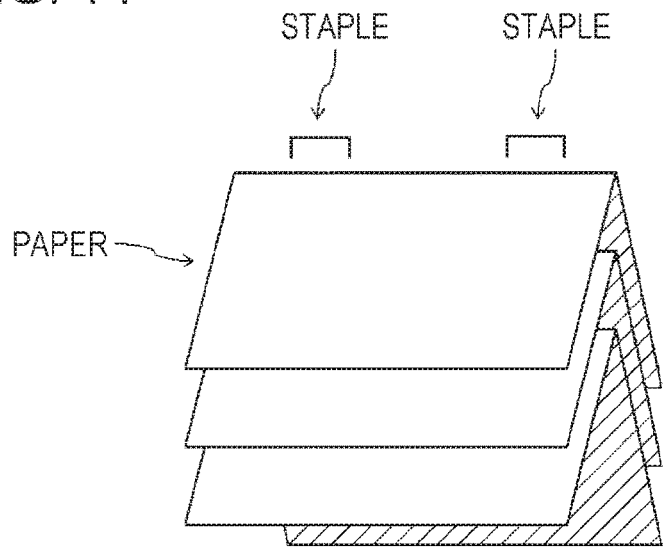
FIG. 14 illustrates a saddle-stitched booklet.

The saddle-stitching unit 24 performs a process for forming a saddle-stitched booklet by performing a saddle-stitching process on plural sheets of printed paper from the image forming device 12. Specifically, the saddle-stitching unit 24 folds sheets of printed paper, collates (superposes) the plural sheets of printed paper which have been folded, and executes a stapling process in which staples are placed at the position of a fold line (see FIG. 14). The saddle-stitching unit 24 may further perform a cutting process in which the fore end side of the saddle-stitched booklet is trimmed after the stapling process.

In the present exemplary embodiment, the fold line which is formed by the folding in the saddle-stitching process is located at the center in the longitudinal direction of the printed paper, and provided so as to extend in the short-length direction of the printed paper. In the post-processing device 14, the staple position is adjustable in the longitudinal direction of the printed paper in order to cause the staple position to coincide with the fold line. In the present exemplary embodiment, the saddle-stitching unit 24 decides the staple position in the longitudinal direction of the printed paper on the basis of information transmitted from the image forming device 12. As a matter of course, the post-processing device 14 may also be capable of adjusting the staple position in the short-length direction of the printed paper. In the description of the present exemplary embodiment, however, focus is placed on the adjustment of the staple position in the longitudinal direction. The fold line which is formed by the folding in the saddle-stitching process may be located at the center in the short-length direction of the printed paper, and provided so as to extend in the longitudinal direction. In such a case, the post-processing device 14 adjusts the staple position in the short-length direction of the printed paper.

Figure 3:
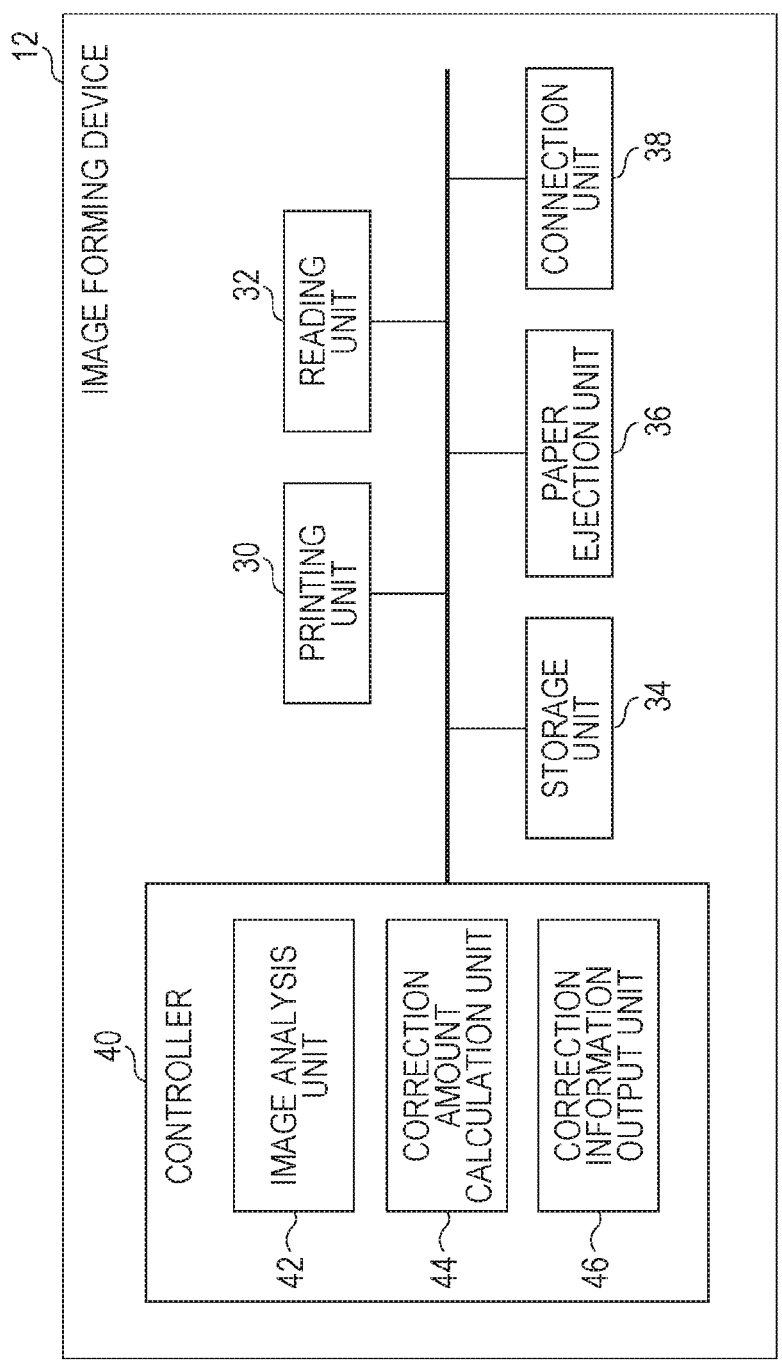
FIG. 3 illustrates a schematic configuration of an image forming apparatus according to the exemplary embodiment.

FIG. 3 illustrates a schematic configuration of the image forming device 12.

A printing unit 30 includes a photosensitive unit, a toner box, a cartridge, a fixing device, and so forth, for example. The printing unit 30 performs a process for printing target print data on a printing medium such as paper in response to a request to execute the print function or the copy function from the user.

A reading unit 32 includes a light source, a charge coupled device (CCD) sensor, platen glass, and so forth, for example. The reading unit 32 optically reads (scans) the document which is set by the user, and performs a process for forming image data.

A storage unit 34 includes a hard disk, a read only memory (ROM), a random access memory (RAM), and so forth, for example. The storage unit 34 stores a program for causing the various units of the image forming device 12 to operate. The storage unit 34 also stores the image data which are formed by the reading unit 32.

A paper ejection unit 36 includes a paper feed roller etc., and ejects the printed paper on which printing has been performed by the printing unit 30 to the post-processing device 14.

A connection unit 38 includes a connector etc., for example, and is provided to be connected to the post-processing device 14 so as to be communicable. Setting information about the saddle-stitching process is output to the post-processing device 14 via the connection unit 38.

A controller 40 includes a microprocessor etc., for example, and causes the various units of the image forming device 12 to operate in accordance with the program which is stored in the storage unit 34. As illustrated in FIG. 3, the controller 40 also functions as an image analysis unit 42, a correction amount calculation unit 44, and a correction information output unit 46.

The various functions of the controller 40 execute a process for detecting the position of the fold line on the cover surface side of the saddle-stitched booklet, and correcting the position of the stapling process which is performed by the saddle-stitching unit 24 (the position in the longitudinal direction of the printed paper in the present exemplary embodiment) such that the stapling position matches the fold line position on the cover surface side.

Prior to the process for correcting the stapling position, the image forming device 12 and the post-processing device 14 perform the following processes. First, the printing unit 30 performs printing on plural sheets of test printed paper on the basis of a user instruction. The test printed paper may be paper that has the same paper characteristics as those of paper to be used in the actual saddle-stitched booklet forming process to be performed after the correction of the stapling position. Then, the saddle-stitching unit 24 executes the saddle-stitching process on the plural sheets of test printed paper. Consequently, a test saddle-stitched booklet is formed. The test saddle-stitched booklet includes the same number of sheets of paper as that of the actual saddle-stitched booklet to be formed after the correction of the stapling position.

The reading unit 32 scans a saddle-stitched surface of the test saddle-stitched booklet in the open state to acquire a saddle-stitched surface picture. The acquired saddle-stitched surface picture is temporarily stored in the storage unit 34. The reading unit 32 also scans a cover surface of the test saddle-stitched booklet in the open state to acquire a cover surface picture. The acquired cover surface picture is temporarily stored in the storage unit 34.

The various functions of the controller 40 perform a process on the saddle-stitched surface picture and the cover surface picture which have been acquired to correct the stapling position. The various functions of the controller 40 will be described in detail below.

Figure 4:
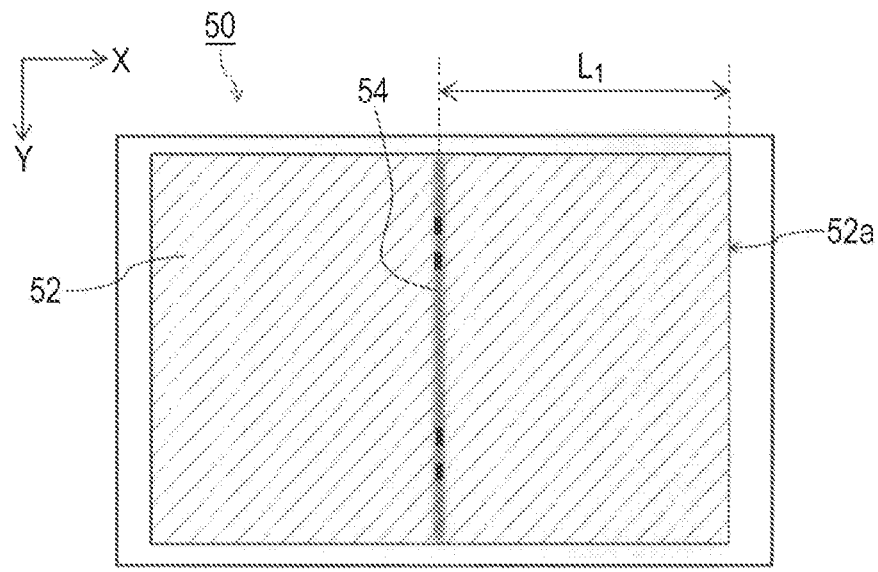
FIG. 4 illustrates an example of a saddle-stitched surface picture.

The image analysis unit 42 detects a saddle stitch-side fold line position, which is the position of a fold line (fold line image) included in the saddle-stitched surface picture, by performing an image analysis process on the saddle-stitched surface picture. FIG. 4 illustrates an example of a saddle-stitched surface picture 50. As illustrated in FIG. 4, the saddle-stitched surface picture 50 includes a saddle-stitched surface image 52. In FIG. 4, the longitudinal direction of the saddle-stitched surface image 52 is defined as an X direction, and the short-length direction which is perpendicular to the X direction is defined as a Y direction. The saddle-stitched surface of the test saddle-stitched booklet has been temporarily folded, and therefore the saddle-stitched surface picture 52 includes a fold line image 54 that extends in the Y direction. The image analysis unit 42 detects the fold line image 54 by performing an image analysis process on the saddle-stitched surface picture 50.

The fold line image 54 may be detected on the basis of the contrast (difference) in the pixel value (brightness or color) in the saddle-stitched surface image 52, for example. For example, if a column of pixels that have pixel values distinguished from those of other portions extends over a certain distance in the Y direction, such a pixel column may be determined to constitute the fold line image 54. In order to make the fold line image 54 better detectable, a certain region that includes the fold line may be filled with a patch in a single color (e.g. black) when performing printing on a sheet of the test printed paper corresponding to the saddle-stitched surface. Consequently, the contrast in the pixel value between the fold line image 54 and pixels around the fold line image 54 may be enhanced in the saddle-stitched surface image 52, as a result of which the fold line image 54 is made better detectable.

Figure 15A:
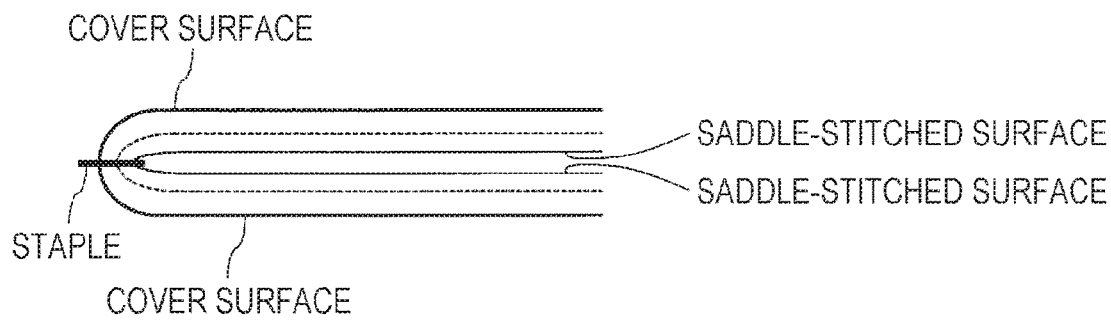
FIGS. 15A and 15B illustrate a saddle-stitched booklet as seen from the tail side (or the head side).
Figure 15B:
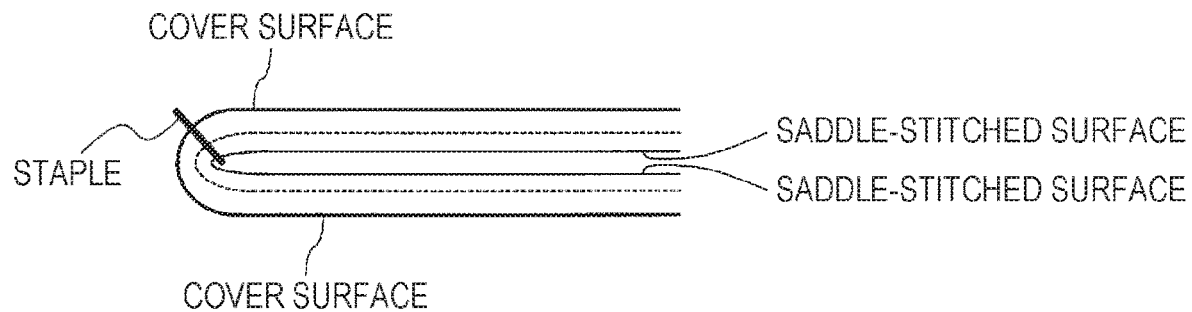

Since the saddle-stitched surface is strongly folded (see FIG. 15A), the image analysis unit 42 is able to detect the fold line image 54 from the saddle-stitched surface image 52 relatively well.

Then, the image analysis unit 42 detects a saddle stitch-side fold line position on the basis of the fold line image 54. In the present exemplary embodiment, the image analysis unit 42 detects a paper edge 52a of the saddle-stitched surface image 52 from the saddle-stitched surface picture 50, and detects the X-direction distance ($L_1$ in FIG. 4) from the paper edge 52a to the fold line image 54 as an index of the saddle stitch-side fold line position. The paper edge 52a is an edge of the saddle-stitched surface image 52 at an end portion in the X direction, and extends in parallel with the extension direction of the fold line image 54 (i.e. Y direction). The paper edge 52a may be detected using an image analysis technique (edge detection process) according to the related art.

Figure 5:
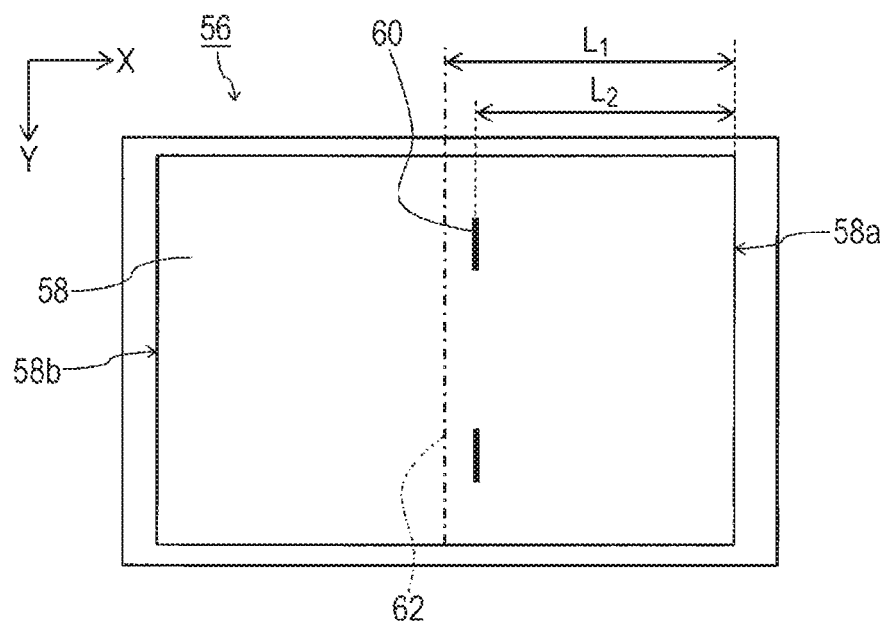
FIG. 5 illustrates an example of a cover surface picture.

FIG. 5 illustrates an example of a cover surface picture 56. As illustrated in FIG. 5, the cover surface picture 56 includes a cover surface image 58. Also in FIG. 5, the longitudinal direction of the cover surface image 58 is defined as an X direction, and the short-length direction is defined as a Y direction. The test saddle-stitched booklet has been stapled, and therefore the cover surface image 58 includes staple images 60. In the present exemplary embodiment, two staple images 60 arranged in the Y direction of the cover surface image 58 are included. Each of the staple images 60 has a linear shape that extends in the Y direction. The image analysis unit 42 detects the staple images 60 by performing an image analysis process on the cover surface picture 56.

The staple images 60 may be detected by an image analysis technique according to the related art such as an edge detection process. In the case where approximate positions of the staples are known in advance, a region to be processed (e.g. the center portion of the cover surface picture 56 in the X direction) in which edge detection is performed in order to detect the staple images 60 may be determined so that the edge detection process is executed in only the region to be processed.

The image analysis unit 42 detects a paper edge 58a of the cover surface image 58 in the same manner as in the process for detecting the paper edge 52a of the saddle-stitched surface image 52. The paper edge 58a also extends in parallel with the Y direction, that is, in parallel with the fold line. The X-direction distance ($L_2$ in FIG. 4) from the paper edge 58a to the staple images 60 is detected as an index of the staple position.

In addition, the image analysis unit 42 specifies a cover-side fold line position 62 on the cover surface picture 56 on the basis of the saddle stitch-side fold line position which is detected in the image analysis process on the saddle-stitched surface picture 50. In the present exemplary embodiment, a position, the X-direction distance to which from the paper edge 58a of the cover surface image 58 corresponds to the X-direction distance ($L_1$ in FIGS. 4 and 5) to the fold line image 54 from the paper edge 52a which is detected from the saddle-stitched surface picture 50, is specified as the cover-side fold line position 62.

The present exemplary embodiment is based on the precondition that the fold line image 54 is positioned at the center of the saddle-stitched surface image 52 in the X direction. Therefore, the paper edge 58a of the cover surface image 58 which is on the same side (right side in FIGS. 4 and 5) as the paper edge 52a of the saddle-stitched surface image 52 is detected, and the staple positions and the cover-side fold line position 62 are detected with reference to the paper edge 58a. However, a paper edge 58b of the cover surface image 58 which is on the opposite side (left side (negative side in the X direction) in the example of FIGS. 4 and 5) to the paper edge 52a may be detected, and the staple positions and the cover-side fold line position 62 may be detected with reference to the paper edge 58b.

The correction amount calculation unit 44 calculates correction information about the stapling position on the basis of the staple positions and the cover-side fold line position 62 which are detected by the image analysis unit 42 from the cover surface picture 56. Specifically, the correction amount calculation unit 44 calculates a correction amount such that the X-direction distance ($L_2$ in the example of FIG. 5) from the paper edge 58a to the staple positions coincides with the X-direction distance ($L_1$ in the example of FIG. 5) from the paper edge 58a to the cover-side fold line position 62. In the present example, the correction direction corresponds to the negative side in the X direction in FIG. 5, and an amount that matches $L_1-L_2$ is calculated as the correction amount. The relationship between the correction amount and $L_1-L_2$ may be decided, as appropriate, in accordance with the image size etc. of the saddle-stitched surface picture 50 and the cover surface picture 56.

The correction information output unit 46 outputs the correction information about the stapling position, which is calculated by the correction amount calculation unit 44, to the post-processing device 14. The correction information includes the correction direction and the correction amount of the stapling position.

The saddle-stitching unit 24 of the post-processing device 14 corrects the stapling position on the basis of the correction information. Consequently, the staple positions may be caused to coincide with the fold line on the cover side.

An overview of the configuration of the image processing system 10 according to the first exemplary embodiment has been described above. In the present exemplary embodiment, the cover-side fold line position 62 is specified on the basis of the saddle stitch-side fold line position at which the paper is folded strongly.

Figure 6:
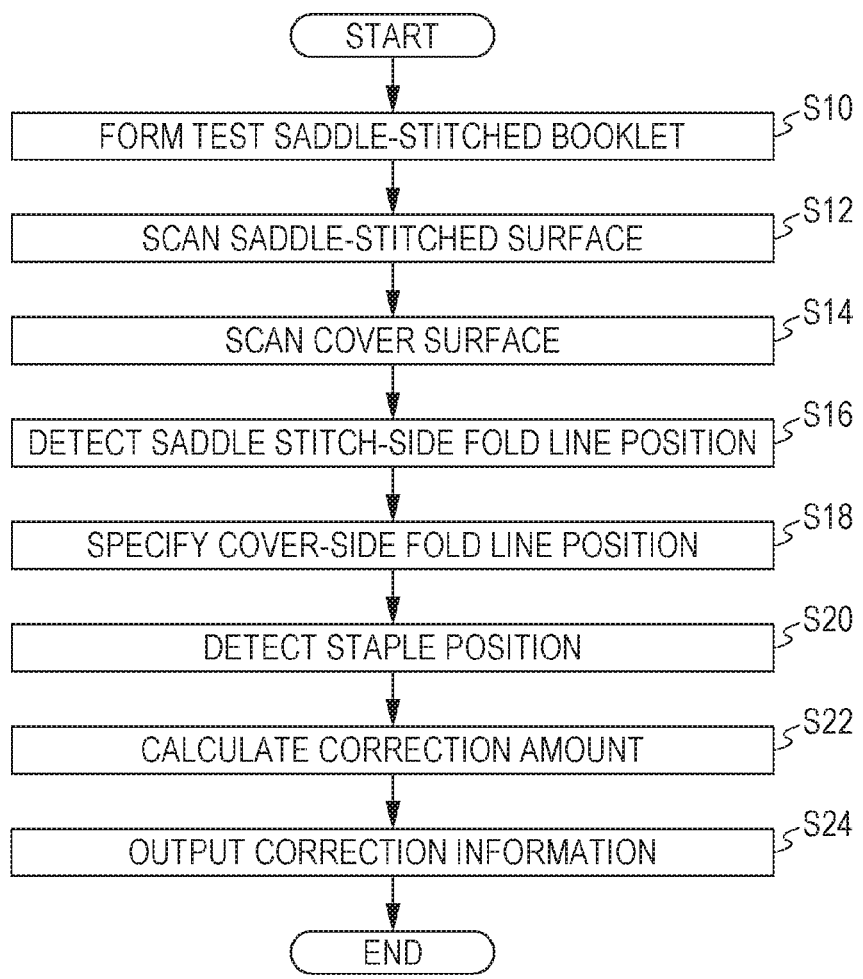
FIG. 6 is a flowchart illustrating the flow of a process performed by the image processing system according to the first exemplary embodiment.

The flow of a process performed by the image processing system 10 according to the first exemplary embodiment will be described below with reference to the flowchart illustrated in FIG. 6.

In step S10, the printing unit 30 performs printing on plural sheets of test printed paper, and the saddle-stitching unit 24 performs a saddle-stitching process on the plural sheets of test printed paper to form a test saddle-stitched booklet.

In step S12, the reading unit 32 scans a saddle-stitched surface of the test saddle-stitched booklet to acquire a saddle-stitched surface picture 50.

In step S14, the reading unit 32 scans a cover surface of the test saddle-stitched booklet to acquire a cover surface picture 56.

In step S16, the image analysis unit 42 detects a fold line image 54 and a paper edge 52a by performing an image analysis on the saddle-stitched surface picture 50, and detects the X-direction distance from the paper edge 52a to the fold line image 54 as an index of the saddle stitch-side fold line position.

In step S18, the image analysis unit 42 detects a paper edge 58a by performing an image analysis on the cover surface picture 56. Then, the image analysis unit 42 specifies a position, the X-direction distance to which from the paper edge 58a corresponds to the distance which is detected in step S16, as a cover-side fold line position 62.

In step S20, the image analysis unit 42 detects staple images 60 by performing an image analysis on the cover surface picture 56, and detects the X-direction distance from the paper edge 58a to the staple images 60 as a staple position. Any of step S18 and step S20 may be executed earlier than the other.

In step S22, the correction amount calculation unit 44 specifies a correction direction for the stapling position, and further calculates a correction amount, on the basis of the cover-side fold line position 62 which is detected in step S18 and the staple positions which are detected in step S20.

In step S24, the correction information output unit 46 outputs correction information that includes the correction direction which is specified in step S22 and the correction amount which is calculated in step S22 to the post-processing device 14.

Second Exemplary Embodiment

In the first exemplary embodiment, as discussed above, the saddle stitch-side fold line position is detected as the X-direction distance from the paper edge 52a of the saddle-stitched surface image 52, and the cover-side fold line position 62 is specified on the basis of the X-direction distance and the paper edge 58a of the cover surface image 58. This is based on the precondition that the X-direction distance from the paper edge 52a to the fold line image 54 on the saddle-stitched surface picture 50 and the X-direction distance from the paper edge 58a to the cover-side fold line position 62 on the cover surface picture 56 are the same as each other.

In some cases, however, the X-direction distance from the paper edge 52a to the fold line image 54 on the saddle-stitched surface picture 50 and the X-direction distance from the paper edge 58a to the cover-side fold line position 62 on the cover surface picture 56 are not the same as each other. For example, there may be a difference between the two distances due to a difference in how the test saddle-stitched booklet is lifted from the platen glass between scanning of the saddle-stitched surface and scanning of the cover surface.

Figure 7A:
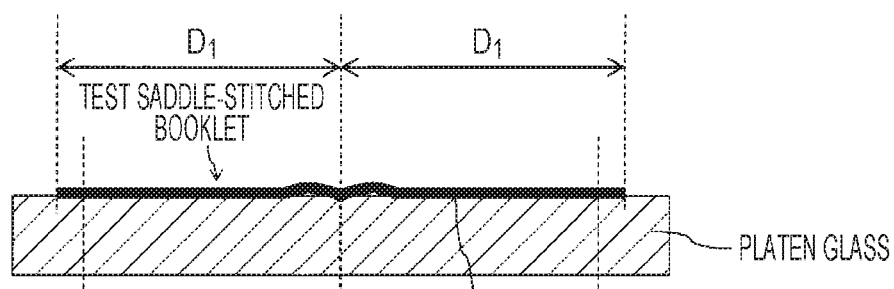
FIGS. 7A and 7B illustrate a state of a saddle-stitched booklet during scanning of a saddle-stitched surface and during scanning of a cover surface, respectively.
Figure 7B:
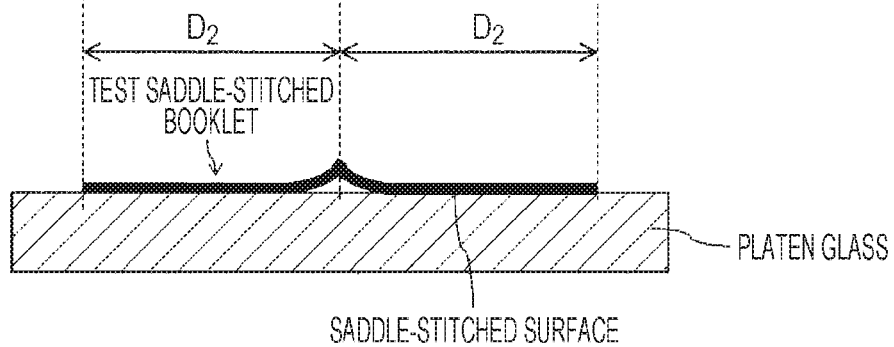

FIG. 7A illustrates the test saddle-stitched booklet as seen from the tail side (or the head side) during scanning of the cover surface. FIG. 7B illustrates the test saddle-stitched booklet as seen from the tail side (or the head side) during scanning of the saddle-stitched surface. During scanning, the test saddle-stitched booklet is pressed onto the platen glass by a top plate (not illustrated). As illustrated in FIGS. 7A and 7B, however, a portion in the vicinity of the fold line (a portion of the saddle-stitched booklet in the vicinity of the "gutter") may be lifted during scanning of the saddle-stitched surface more greatly than during scanning of the cover surface. This is because a surface of the test saddle-stitched booklet on the platen glass side is mountain-folded during scanning of the cover surface and a surface of the test saddle-stitched booklet on the platen glass side is valley-folded during scanning of the saddle-stitched surface, etc.

As a result, the horizontal distance ($D_2$ in FIG. 7B) from the fore edge-side end portion to the fold line of the test saddle-stitched booklet during scanning of the saddle-stitched surface may be shorter than the horizontal distance ($D_1$ in FIG. 7A) from the fore edge-side end portion to the fold line of the test saddle-stitched booklet during scanning of the cover surface. Then, the X-direction distance from the paper edge 52a to the fold line image 54 on the saddle-stitched surface picture 50 and the X-direction distance from the paper edge 58a to the cover-side fold line position 62 on the cover surface picture 56 may be different from each other. The lift of the test saddle-stitched booklet from the platen glass normally occurs on both sides of the fold line alike. Therefore, the horizontal distance from the fold line to the fore edge-side end portion on the left side in FIG. 7A is also $D_1$, and the horizontal distance from the fold line to the fore edge-side end portion on the left side in FIG. 7B is also $D_2$.

In the second exemplary embodiment, in view of the issue discussed above, a process for suitably specifying a cover-side fold line position 84 even in the case where there is a difference in the horizontal distance ($D_1$ and $D_2$ in FIGS. 7A and 7B) from the fold line to the fore edge-side end portion between scanning of the cover surface and scanning of the saddle-stitched surface. The schematic configuration of the image processing system 10, the image forming device 12, and the post-processing device 14 according to the second exemplary embodiment is the same as that according to the first exemplary embodiment, and is not described.

In the second exemplary embodiment, before the reading unit 32 performs a reading process on the saddle-stitched surface and the cover surface of the test saddle-stitched booklet, the printing unit 30 prints a saddle stitch-side mark pair as a first mark pair on a sheet of the test printed paper corresponding to the saddle-stitched surface of the test saddle-stitched booklet, and prints a cover-side mark pair as a second mark pair on a sheet of the test printed paper corresponding to the cover surface.

The saddle stitch-side mark pair includes two saddle stitch-side marks. The two saddle stitch-side marks are printed at positions on different sides of the fold line of the saddle-stitched surface. The saddle stitch-side mark pair is printed at positions on different sides of the fold line of the saddle-stitched surface before the fold line position on the saddle-stitched surface is detected. Since an error in the fold line position on the saddle-stitched surface is not so large (normally about several millimeters), however, the saddle stitch-side mark pair is printed at positions reliably on different sides of the fold line of the saddle-stitched surface in consideration of the maximum error in the fold line position on the saddle-stitched surface. In addition, as discussed later, the saddle stitch-side mark pair is preferably printed at a position at which the saddle-stitched surface tightly contacts the platen glass during scanning of the saddle-stitched surface so that images corresponding to the saddle stitch-side mark pair suitably appear on the saddle-stitched surface picture which is obtained by scanning the saddle-stitched surface.

The cover-side mark pair is printed at the same position as that of the saddle stitch-side mark pair on the saddle-stitched surface. As with the saddle stitch-side mark pair, the cover-side mark pair also includes two cover-side marks printed at positions on different sides of the fold line of the cover surface. In addition, the cover-side mark pair is also preferably printed at a position at which the cover surface tightly contacts the platen glass during scanning of the cover surface.

Figure 8:
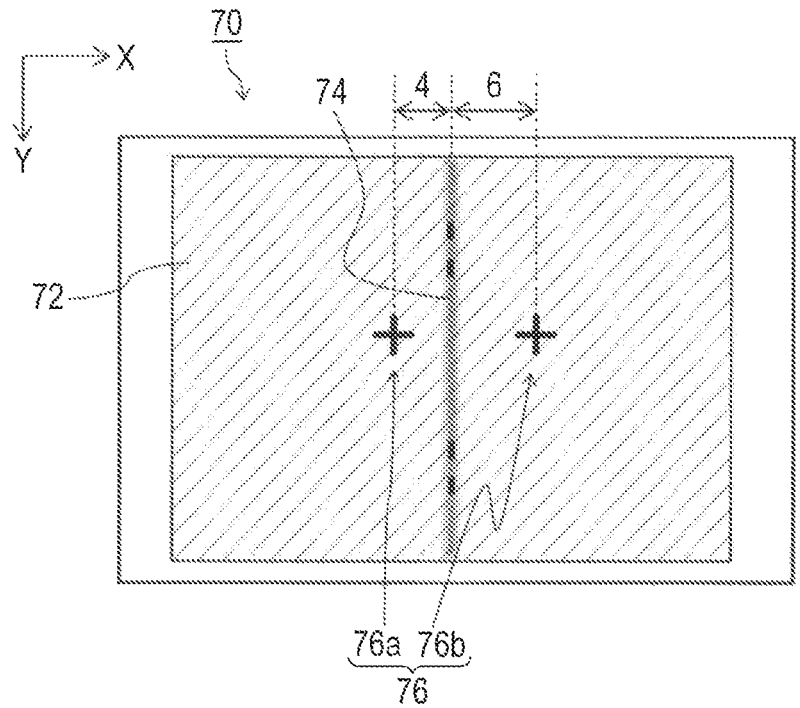
FIG. 8 illustrates an example of a saddle-stitched surface picture that includes saddle stitch-side mark pair images.

FIG. 8 illustrates a saddle-stitched surface picture 70 obtained by the reading unit 32 scanning the saddle-stitched surface on which the saddle stitch-side mark pair is printed. The saddle-stitched surface picture 70 includes a saddle-stitched surface image 72. The saddle-stitched surface image 72 includes a saddle stitch-side mark image pair 76 that serves as a first mark image pair and that corresponds to the saddle stitch-side mark pair. The saddle stitch-side mark image pair 76 includes saddle stitch-side mark images 76a and 76b. The saddle stitch-side mark images 76a and 76b (i.e. the saddle stitch-side marks) are preferably shaped such that the positions of the saddle stitch-side mark images 76a and 76b in the X direction are easily detectable through an image analysis process on the saddle-stitched surface picture 70. In the present exemplary embodiment, the saddle stitch-side mark images 76a and 76b each have a cross shape.

Also in the second exemplary embodiment, as in the first exemplary embodiment, the image analysis unit 42 detects the fold line image 74 by performing an image analysis process on the saddle-stitched surface picture 70. In the second exemplary embodiment, the image analysis unit 42 further detects the saddle stitch-side mark images 76a and 76b through the image analysis process on the saddle-stitched surface picture 70. Since the saddle stitch-side marks are printed on different sides of the fold line as discussed above, the saddle stitch-side mark images 76a and 76b are detected at positions on different sides of the fold line image 74.

In the second exemplary embodiment, a saddle stitch-side fold line position is detected in accordance with the positional relationship among the saddle stitch-side mark images 76a and 76b and the fold line image 74. Specifically, the image analysis unit 42 detects the ratio between the X-direction distance from the fold line image 74 to the saddle stitch-side mark image 76a and the X-direction distance from the fold line image 74 to the saddle stitch-side mark image 76b as an index of the saddle stitch-side fold line position. In the example of FIG. 8, for example, the X-direction distance from the fold line image 74 to the saddle stitch-side mark image 76a is 4, and the X-direction distance from the fold line image 74 to the saddle stitch-side mark image 76b is 6, and thus a ratio of 4:6 is detected as an index of the saddle stitch-side fold line position.

Figure 9:
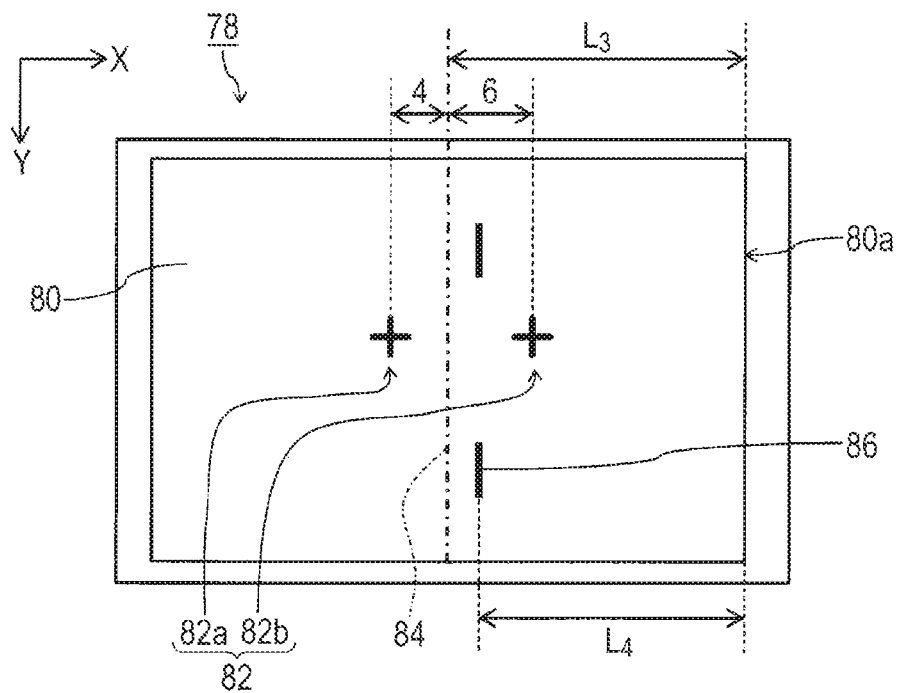
FIG. 9 illustrates an example of a cover surface picture that includes cover-side mark pair images.

FIG. 9 illustrates a cover surface picture 78 obtained by the reading unit 32 scanning the cover surface on which the cover-side mark pair is printed. The cover surface picture 78 includes a cover surface image 80. The cover surface image 80 includes a cover-side mark image pair 82 that serves as a second mark image pair and that corresponds to the cover-side mark pair. The cover-side mark image pair 82 includes cover-side mark images 82a and 82b. The cover-side mark images 82a and 82b (i.e. the cover-side marks) are also preferably shaped such that the positions of the cover-side mark images 82a and 82b in the X direction are easily detectable through an image analysis process on the cover surface picture 78. In the present exemplary embodiment, the cover-side mark images 82a and 82b each have a cross shape as with the saddle stitch-side mark images 76a and 76b. The image analysis unit 42 detects the cover-side mark images 82a and 82b by analyzing the cover surface picture 78.

In the second exemplary embodiment, the image analysis unit 42 specifies a cover-side fold line position on the basis of the ratio between the X-direction distance from the fold line image 74 to the saddle stitch-side mark image 76a and the X-direction distance from the fold line image 74 to the saddle stitch-side mark image 76b, which are detected from the saddle-stitched surface picture 70, and the X-direction distance between the cover-side mark images 82a and 82b, which is detected from the cover surface picture 78. In the present example, the ratio between the X-direction distance from the fold line image 74 to the saddle stitch-side mark image 76a and the X-direction distance from the fold line image 74 to the saddle stitch-side mark image 76b is 4:6, and thus the image analysis unit 42 specifies a position in the X direction to which the X-direction distance from the cover-side mark image 82a is represented as 4 and to which the X-direction distance from the cover-side mark image 82b is represented as 6, as a cover-side fold line position 84.

Then, the image analysis unit 42 detects a paper edge 80a of the cover surface image 80, detects the X-direction distance ($L_3$ in FIG. 9) from the paper edge 80a to the specified cover-side fold line position 84. Then, as in the first exemplary embodiment, the image analysis unit 42 detects staple images 86 from the cover surface image 80, and detects the X-direction distance ($L_4$ in FIG. 9) from the paper edge 80a to the staple image 86.

The correction amount calculation unit 44 calculates a correction amount such that the X-direction distance ($L_4$) from the paper edge 80a to the staple images 86 coincides with the X-direction distance ($L_3$) from the paper edge 80a to the cover-side fold line position 84. In the present example, the correction direction corresponds to the negative side in the X direction in FIG. 5, and an amount that matches $L_3$–$L_4$ is calculated as the correction amount.

In the second exemplary embodiment, in order to accurately specify the cover-side fold line position 84 on the cover surface picture 78, it is necessary to accurately print the cover-side mark pair on the cover surface at the same position as the position of the saddle stitch-side mark pair on the saddle-stitched surface. Because of the effect of print misregistration that may occur because of a variety of factors, however, it is also conceivable that the cover-side mark pair may not be printed on the cover surface accurately at the same position as the position of the saddle stitch-side mark pair on the saddle-stitched surface. In the second exemplary embodiment, in order to prepare for such a case, a process for detecting positional misregistration during printing between the saddle stitch-side mark pair and the cover-side mark pair and dissolving the effect of such positional misregistration may be executed. Such a process will be described below.

First, before the reading unit 32 performs scanning the saddle-stitched surface and the cover surface of the test saddle-stitched booklet, the printing unit 30 prints a saddle stitch-side misregistration detection mark that serves as a first misregistration detection mark, together with the saddle stitch-side mark pair, on a sheet of the test printed paper corresponding to the saddle-stitched surface of the test saddle-stitched booklet, and prints a cover-side misregistration detection mark that serves as a second misregistration detection mark, together with the cover-side mark pair, on a sheet of the test printed paper corresponding to the cover surface.

The printing unit 30 performs a process for printing (attempting to print) the cover-side misregistration detection mark on the cover surface at the same position as that of the saddle stitch-side misregistration detection mark on the saddle-stitched surface. Occasionally, the cover-side misregistration detection mark is not printed at the same position as that of the saddle stitch-side misregistration detection mark on the saddle-stitched surface because of print misregistration between the saddle-stitched surface and the cover surface. However, the point is that the positional relationship between the saddle stitch-side mark pair and the saddle stitch-side misregistration detection mark is constant, and that the positional relationship between the cover-side mark pair and the cover-side misregistration detection mark is also constant.

As discussed later, print misregistration is detected on the basis of the X-direction distance from the paper edge of the saddle-stitched surface picture to a saddle stitch-side misregistration detection mark image corresponding to the saddle stitch-side misregistration detection mark and the X-direction distance from the paper edge of the cover surface picture to a cover-side misregistration detection mark image corresponding to the cover-side misregistration detection mark, and therefore the saddle stitch-side misregistration detection mark and the cover-side misregistration detection mark are preferably printed in the vicinity of the fore-end side edge of the saddle-stitched surface or the cover surface.

Figure 10:
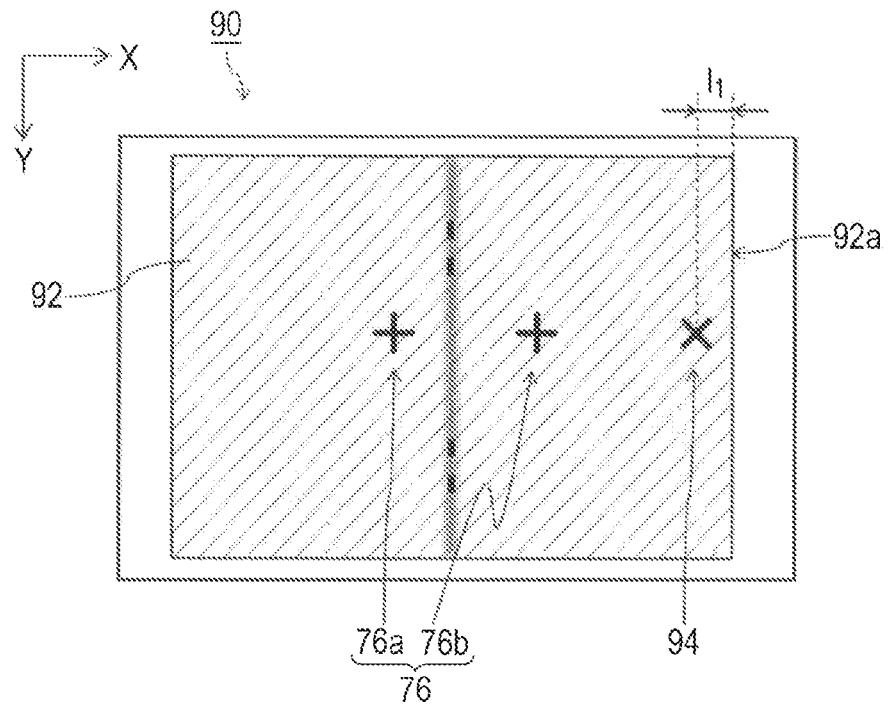
FIG. 10 illustrates an example of a saddle-stitched surface picture that includes saddle stitch-side mark pair images and a saddle stitch-side misregistration detection mark image.

FIG. 10 illustrates a saddle-stitched surface picture 90 obtained by the reading unit 32 scanning the saddle-stitched surface on which the saddle stitch-side mark pair and the saddle stitch-side misregistration detection mark are printed. The saddle-stitched surface picture 90 includes a saddle-stitched surface image 92. The saddle-stitched surface image 92 includes a saddle stitch-side mark image pair 76 and a saddle stitch-side misregistration detection mark image 94 that serves as a first misregistration detection mark image and that corresponds to the saddle stitch-side misregistration detection mark. The saddle stitch-side misregistration detection mark image 94 is also preferably shaped such that the position of the saddle stitch-side misregistration detection mark image 94 in the X direction is easily detectable through an image analysis process on the saddle-stitched surface picture 90.

The image analysis unit 42 detects a paper edge 92a of the saddle-stitched surface image 92, and detects the X-direction distance ($l_1$ in the example of FIG. 10) from the paper edge 92a to the saddle stitch-side misregistration detection mark image 94 as a first distance.

Figure 11:
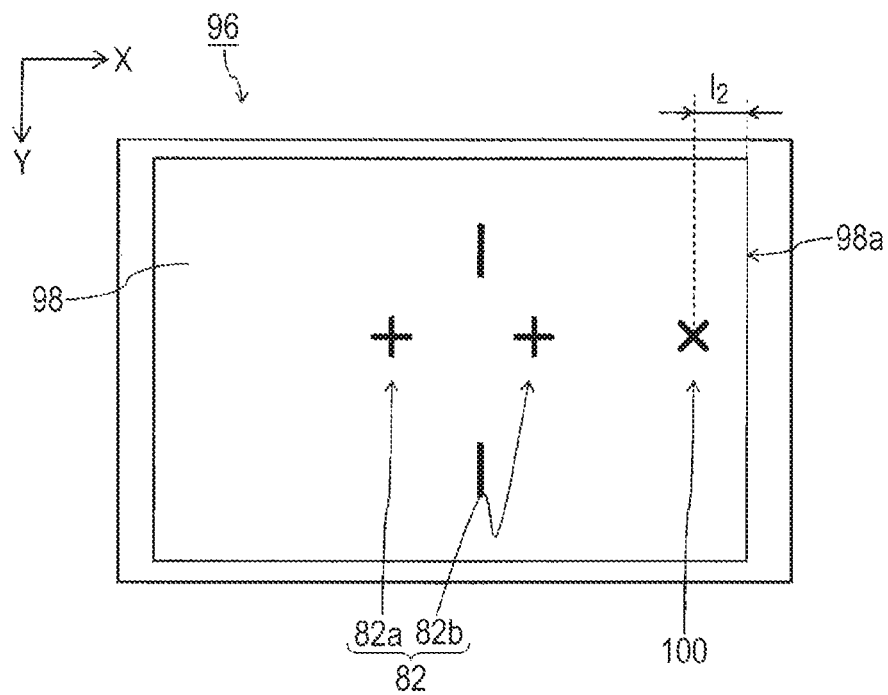
FIG. 11 illustrates an example of a cover surface picture that includes cover-side mark pair images and a cover-side misregistration detection mark image.

FIG. 11 illustrates a cover surface picture 96 obtained by the reading unit 32 scanning the cover surface on which the cover-side mark pair and the cover-side misregistration detection mark are printed. The cover surface picture 96 includes a cover surface image 98. The cover surface image 98 includes a cover-side mark image pair 82 and a cover-side misregistration detection mark image 100 that serves as a second misregistration detection mark image and that corresponds to the cover-side misregistration detection mark. The cover-side misregistration detection mark image 100 is also preferably shaped such that the position of the cover-side misregistration detection mark image 100 in the X direction is easily detectable through an image analysis process on the cover surface picture 96.

The image analysis unit 42 detects a paper edge 98a of the cover surface image 98, and detects the X-direction distance ($l_2$ in the example of FIG. 11) from the paper edge 98a to the cover-side misregistration detection mark image 100 as a second distance.

Since the positional relationship between the saddle stitch-side mark pair and the saddle stitch-side misregistration detection mark is constant as discussed above, the positional relationship between the saddle stitch-side mark image pair 76 and the saddle stitch-side misregistration detection mark image 94 is also constant. In addition, since the positional relationship between the cover-side mark pair and the cover-side misregistration detection mark is constant, the positional relationship between the cover-side mark image pair 82 and the cover-side misregistration detection mark image 100 is also constant. Thus, if there is a difference between the X-direction distance $l_1$ from the paper edge 92a to the saddle stitch-side misregistration detection mark image 94 and the X-direction distance $l_2$ from the paper edge 98a to the cover-side misregistration detection mark image 100, the image analysis unit 42 may determine that print misregistration is caused between the saddle-stitched surface and the cover surface, that is, positional misregistration is caused between the saddle stitch-side mark image pair 76 and the cover-side mark image pair 82. If the X-direction distance $l_1$ and the X-direction distance $l_2$ are the same as each other, the image analysis unit 42 may determine that no print misregistration is caused between the saddle-stitched surface and the cover surface.

In the case where there is a difference between the X-direction distance $l_1$ and the X-direction distance $l_2$, the image analysis unit 42 detects a cover-side fold line position after adjusting the position of either the saddle stitch-side mark image pair 76 or the cover-side mark image pair 82 in the X direction (i.e. a direction that is perpendicular to the fold line) on the basis of the difference ($l_2-l_1$) between the two X-direction distances. In this way, the image analysis unit 42 also functions as a mark image position adjustment unit.

Figure 12:
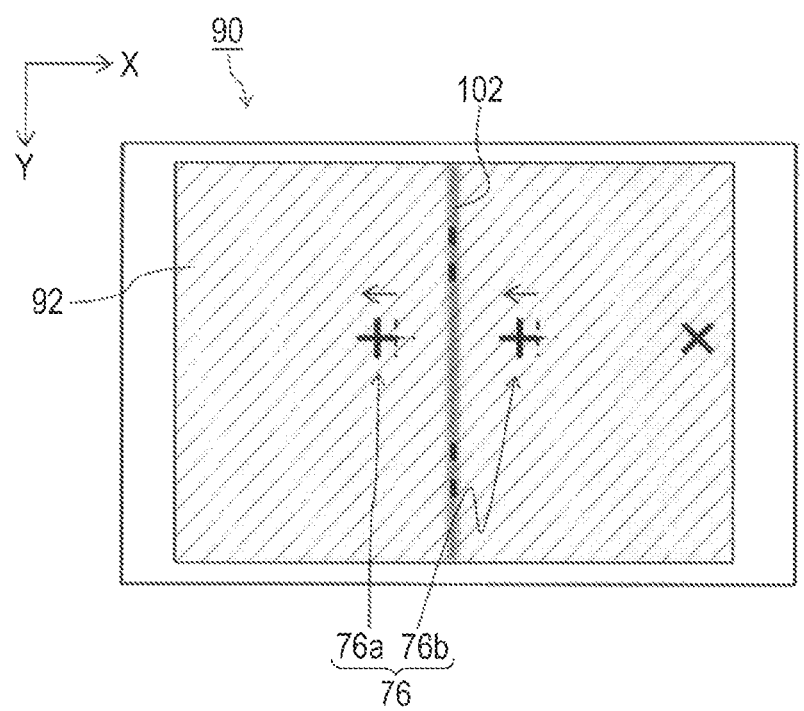
FIG. 12 is a conceptual diagram illustrating how the positions of the saddle stitch-side mark pair images are corrected.

In the present exemplary embodiment, in the case where there is a difference between the X-direction distance $l_1$ and the X-direction distance $l_2$, the image analysis unit 42 adjusts the X-direction position of the saddle stitch-side mark image pair 76 by ($l_2-l_1$) toward the negative side in the X direction. For example, in the case where the X-direction distance $l_1$ is 5 mm and the X-direction distance $l_2$ is 10 mm, the image analysis unit 42 construes the position of the saddle stitch-side mark image pair 76 as having been moved by 5 mm toward the negative side in the X direction from the actual position as illustrated in FIG. 12. After that, as in the second exemplary embodiment discussed above, the image analysis unit 42 detects the ratio between the X-direction distance from a detected fold line image 102 to the saddle stitch-side mark image 76a after the adjustment and the X-direction distance from the fold line image 102 to the saddle stitch-side mark image 76b after the adjustment as the saddle stitch-side fold line position. The subsequent processes are the same as those according to the second exemplary embodiment.

In the present exemplary embodiment, in the case where there is a difference between the X-direction distance $l_1$ and the X-direction distance $l_2$, the image analysis unit 42 adjusts the position of the saddle stitch-side mark image pair 76. However, the image analysis unit 42 may adjust the position of the cover-side mark image pair 82. Specifically, in the case where there is a difference between the X-direction distance $l_1$ and the X-direction distance $l_2$, the image analysis unit 42 adjusts the X-direction position of the cover-side mark image pair 82 by ($l_2-l_1$) toward the positive side in the X direction. For example, in the case where the X-direction distance $l_1$ is 5 mm and the X-direction distance $l_2$ is 10 mm, the image analysis unit 42 may specify the cover-side fold line position while construing the position of the cover-side mark image pair 82 as having been moved by 5 mm toward the positive side in the X direction from the actual position.

Figure 13:
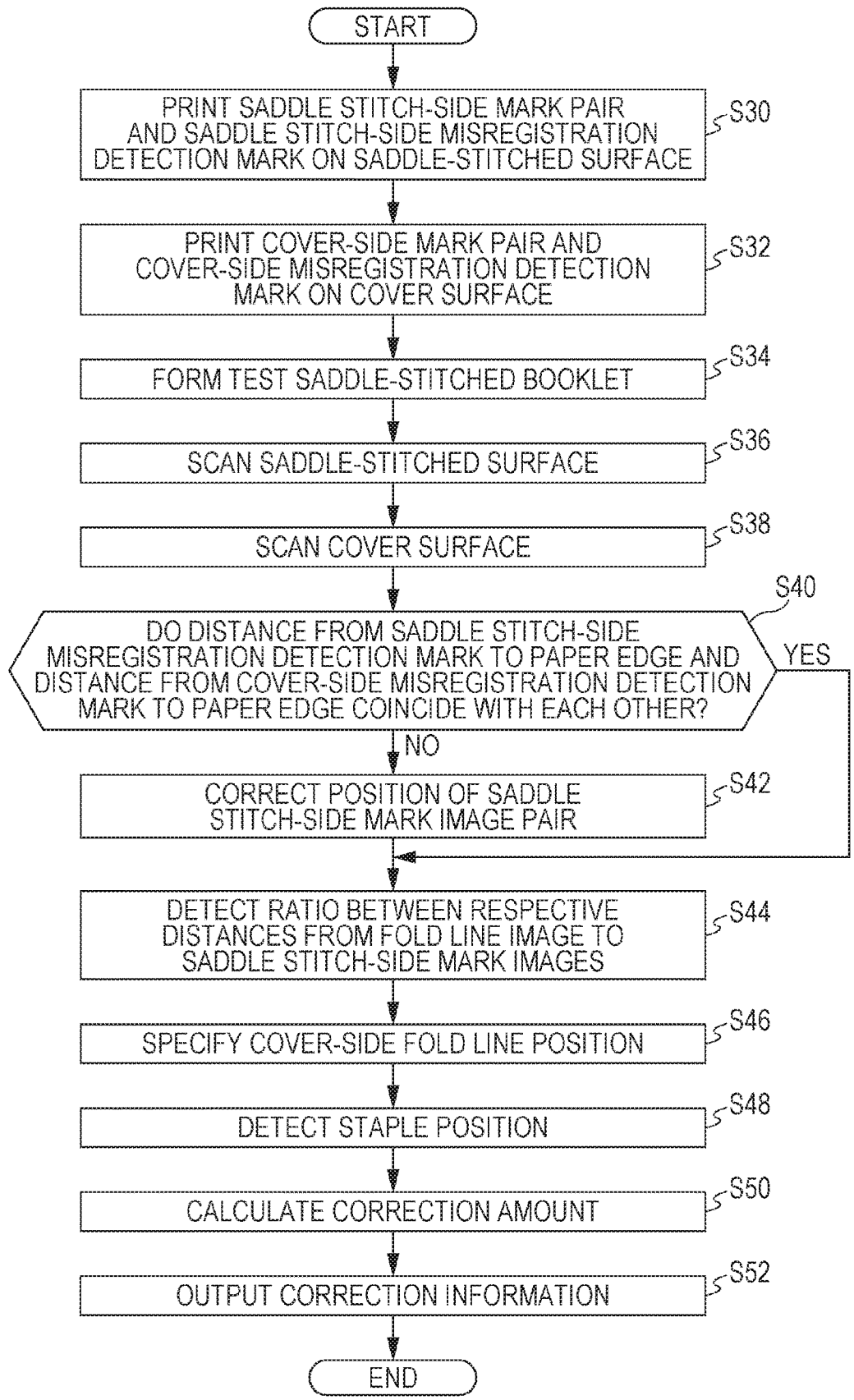
FIG. 13 is a flowchart illustrating the flow of a process performed by an image processing system according to a second exemplary embodiment.

The flow of a process performed by the image processing system 10 according to the second exemplary embodiment will be described below with reference to the flowchart illustrated in FIG. 13.

In step S30, the printing unit 30 prints a saddle stitch-side mark pair and a saddle stitch-side misregistration detection mark on a sheet of test paper to generate a sheet of test printed paper corresponding to the saddle-stitched surface.

In step S32, the printing unit 30 prints a cover-side mark pair and a cover-side misregistration detection mark on a sheet of test paper to generate a sheet of test printed paper corresponding to the cover surface.

In step S34, the saddle-stitching unit 24 forms a test saddle-stitched booklet using plural sheets of test printed paper that include the sheet of test printed paper corresponding to the saddle-stitched surface and the sheet of test printed paper corresponding to the cover surface which are generated in steps S30 and S32.

In step S36, the reading unit 32 scans a saddle-stitched surface of the test saddle-stitched booklet to generate a saddle-stitched surface picture 90.

In step S38, the reading unit 32 scans a cover surface of the test saddle-stitched booklet to generate a cover surface picture 96.

In step S40, the image analysis unit 42 detects a paper edge 92a of the saddle-stitched surface image 92 and a saddle stitch-side misregistration detection mark image 94 by performing an image analysis on the saddle-stitched surface picture 90, and detects the X-direction distance $l_1$ from the paper edge 92a to the saddle stitch-side misregistration detection mark image 94. In addition, the image analysis unit 42 detects a paper edge 98a of the cover surface image 98 and a cover-side misregistration detection mark image 100 by performing an image analysis on the cover surface picture 96, and detects the X-direction distance $l_2$ from the paper edge 98a to the cover-side misregistration detection mark image 100. Then, the image analysis unit 42 determines whether or not the X-direction distance $l_1$ and the X-direction distance $l_2$ which have been detected coincide with each other. In the case where the X-direction distance $l_1$ and the X-direction distance $l_2$ coincide with each other, the image analysis unit 42 determines that there is no print misregistration between the saddle stitch-side mark pair and the cover-side mark pair, and the process proceeds to step S44 by bypassing step S42. In the case where the X-direction distance $l_1$ and the X-direction distance $l_2$ do not coincide with each other, the image analysis unit 42 determines that there is print misregistration between the saddle stitch-side mark pair and the cover-side mark pair, and the process proceeds to step S42.

In step S42, the image analysis unit 42 detects a saddle stitch-side mark image pair 76 from the saddle-stitched surface picture 90, and thereafter adjusts the X-direction position of the saddle stitch-side mark image pair 76 by $(l_2-l_1)$ toward the negative side in the X direction.

In step S44, the image analysis unit 42 detects a fold line image 102 from the saddle-stitched surface picture 90, and detects the ratio between the X-direction distance from the fold line image 102 to the saddle stitch-side mark image 76a (the position of the saddle stitch-side mark image 76a after the adjustment in the case where the process has gone through step S42) and the X-direction distance from the fold line image 102 to the saddle stitch-side mark image 76b (the position of the saddle stitch-side mark image 76b after the adjustment in the case where the process has gone through step S42) as an index of the saddle stitch-side fold line position.

In step S46, the image analysis unit 42 detects a cover-side mark image pair 82 from the cover surface picture 96, and thereafter detects a cover-side fold line position on the basis of the ratio which is detected in step S44 and the distance between the cover-side mark image pair 82. Then, the image analysis unit 42 detects a paper edge 98a of the cover surface image 98, and detects the X-direction distance from the paper edge 98a to the cover-side fold line position.

In step S48, the image analysis unit 42 detects staple images by performing an image analysis on the cover surface picture, and detects the X-direction distance from the paper edge 98a to the staple images as a staple position.

In step S50, the correction amount calculation unit 44 specifies a correction direction for the stapling position, and calculates a correction amount, on the basis of the X-direction distance from the paper edge 98a to the cover-side fold line position which is detected in step S46 and the X-direction distance from the paper edge 98a to the staple images which is detected in step S48.

In step S52, the correction information output unit 46 outputs correction information that includes the correction direction which is specified in step S50 and the correction amount which is calculated in step S50 to the post-processing device 14.

While exemplary embodiments of the present invention have been described above, the present invention is not limited to the above exemplary embodiments, and may be modified in various ways without departing from the scope and spirit of the present invention. For example, the image processing apparatus according to the present invention is the image forming device 12 in the description of the first exemplary embodiment and the second exemplary embodiment. However, the image processing apparatus according to the present invention is not limited to the image forming device 12, and may be other devices that include at least the image analysis unit 42, the correction amount calculation unit 44, and the correction information output unit 46.

What is claimed is:

1. An image processing apparatus comprising:
   a reading sensor configured to acquire a saddle-stitched surface picture by reading a saddle-stitched surface of a saddle-stitched booklet formed through folding and stapling processes performed by a saddle-stitching device, and configured to acquire a cover surface picture by reading a cover surface of the saddle-stitched booklet; and
   at least one hardware processor configured to execute the instructions to implement a correction information output unit configured to output correction information about a stapling position to the saddle-stitching device, the correction information being calculated based on a difference between a cover-side fold line position on the cover surface picture, which is specified based on a saddle stitch-side fold line position detected from the saddle-stitched surface picture, and a staple position detected from the cover surface picture.

2. The image processing apparatus according to claim 1, wherein a position, a distance to which from a paper edge that is parallel to a fold line detected from the cover surface picture corresponds to a distance to the saddle stitch-side fold line position from a paper edge that is parallel to the fold line detected from the saddle-stitched surface picture, is specified as the cover-side fold line position.

3. The image processing device according to claim 1, further comprising:
   a printer configured to, prior to a reading process performed by the reading sensor, print a first mark pair on the saddle-stitched surface at positions on different sides of a fold line and configured to print a second mark pair on the cover surface at a same position as that of the first mark pair on the saddle-stitched surface,
   wherein the saddle-stitched surface picture includes a first mark image pair corresponding to the first mark pair, and the cover surface picture includes a second mark image pair corresponding to the second mark pair, and
   the cover-side fold line position is specified based on a ratio between a distance from one mark image of the first mark image pair to the saddle stitch-side fold line position and a distance from the other mark image of the first mark image pair to the saddle stitch-side fold line position and a distance between the second mark image pair.

4. The image processing apparatus according to claim 3, wherein, prior to the reading process performed by the reading sensor, the printer is configured to print a first misregistration detection mark for detecting positional misregistration between the first mark pair and the second mark pair on the saddle-stitched surface, and configured to print a second misregistration detection mark on the cover surface at a same position as that of the first misregistration detection mark on the saddle-stitched surface, the saddle-stitched surface picture includes a first misregistration detection mark image corresponding to the first misregistration detection mark, and the cover surface picture includes a second misregistration detection mark image corresponding to the second misregistration detection mark, and the image processing apparatus further comprises a mark image position adjustment unit configured to, in a case where there is a difference between a first distance to the first misregistration detection mark image from a paper edge that is parallel to the fold line detected from the saddle-stitched surface picture and a second distance to the second misregistration detection mark image from a paper edge that is parallel to the fold line detected from the cover surface picture, adjust a position of either the first mark image pair or the second mark image pair in a direction that is perpendicular to the fold line based on the difference between the first distance and the second distance, prior to specifying the cover-side fold line position.

5. An image processing method comprising:

acquiring a saddle-stitched surface picture by reading a saddle-stitched surface of a saddle-stitched booklet formed through folding and stapling processes performed by a saddle-stitching device, and acquiring a cover surface picture by reading a cover surface of the saddle-stitched booklet; and outputting correction information about a stapling position to the saddle-stitching device, the correction information being calculated based on a difference between a cover-side fold line position on the cover surface picture, which is specified based on a saddle stitch-side fold line position detected from the saddle-stitched surface picture, and a staple position detected from the cover surface picture.

6. An image processing apparatus comprising:

reading means for acquiring a saddle-stitched surface picture by reading a saddle-stitched surface of a saddle-stitched booklet formed through folding and stapling processes performed by a saddle-stitching device, and acquiring a cover surface picture by reading a cover surface of the saddle-stitched booklet; and correction means for outputting correction information about a stapling position to the saddle-stitching device, the correction information being calculated based on a difference between a cover-side fold line position on the cover surface picture, which is specified based on a saddle stitch-side fold line position detected from the saddle-stitched surface picture, and a staple position detected from the cover surface picture.

7. The image processing device according to claim 1, wherein the saddle-stitched surface and the cover surface are provided opposite to each other in a thickness direction of the saddle-stitched booklet.

8. The image processing method according to claim 5, wherein the saddle-stitched surface and the cover surface are provided opposite to each other in a thickness direction of the saddle-stitched booklet.

9. The image processing apparatus according to claim 6, wherein the saddle-stitched surface and the cover surface are provided opposite to each other in a thickness direction of the saddle-stitched booklet.

* * * * *